April 25, 1933.  I. JACOBS  1,905,718
FASTENER
Filed June 10, 1929
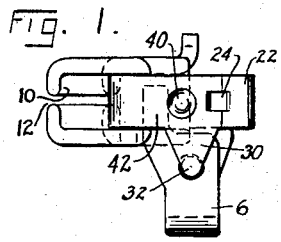
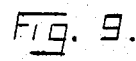
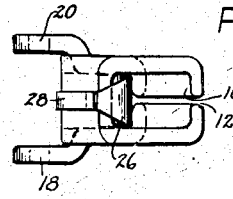
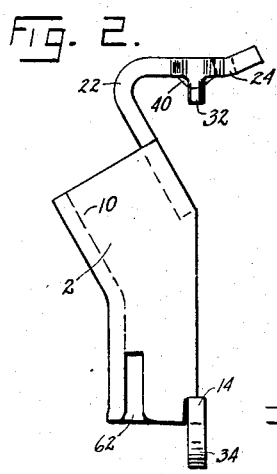
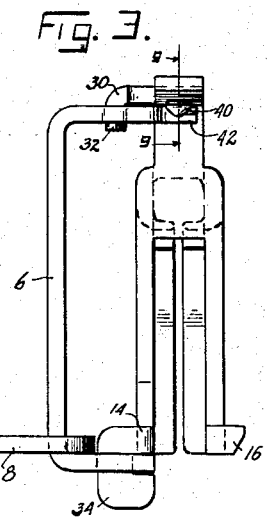
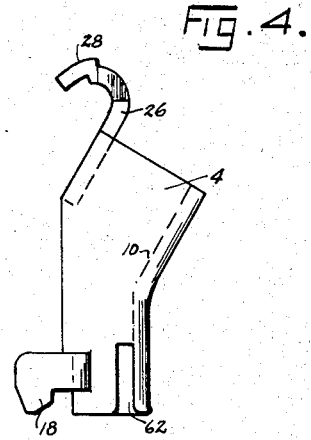
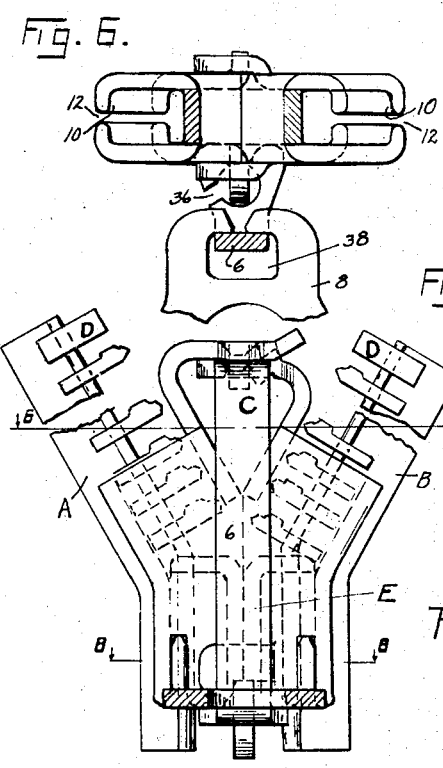
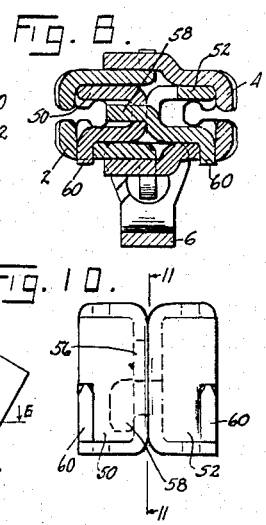
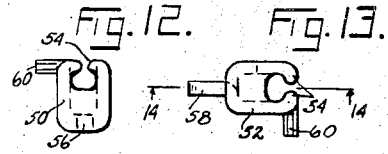
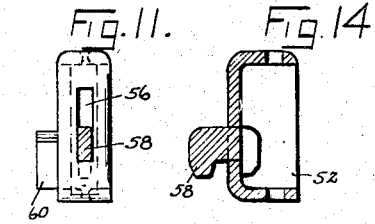
INVENTOR.
ISIDOR JACOBS
BY
Cavanagh & James
ATTORNEYS.

Patented Apr. 25, 1933

1,905,718

UNITED STATES PATENT OFFICE

ISIDOR JACOBS, OF UNION CITY, NEW JERSEY, ASSIGNOR TO G. E. PRENTICE MANUFACTURING COMPANY, OF NEW BRITAIN, CONNECTICUT, A CORPORATION OF CONNECTICUT

FASTENER

Application filed June 10, 1929. Serial No. 369,558.

This invention relates to fasteners, more particularly to a completely separable slide fastener.

Slide fasteners have become quite popular for a multitude of purposes, such fasteners comprising in general a pair of relatively flexible stringers which are locked or unlocked by a sliding cam device or slider mounted on the stringers, movement in one direction serving to lock the stringers together, and movement in the opposite direction serving to unlock the stringers.

Such fasteners have been used to open and close a slit which remains closed at both ends, as in a tobacco pouch or the like, and have also been used to open and close a slit which remains closed at one end, as on an overshoe or the like. For some purposes it is exceedingly desirable to provide a completely separable fastener, that is, a fastener which may be opened at the ends as well as intermediate the ends, so that the stringers may be taken entirely apart. Accordingly, the object of the present invention resides generally in the provision of a completely separable slide fastener.

It is desirable that the cam device of the slide fastener remain with the stringers, in order to prevent accidental loss thereof, and still more desirable to keep each half or cam member of the cam device or slider in operative engagement with its corresponding stringer, so as to avoid the necessity of having to insert the stringers into the cam members. To the attainment of these objects my invention includes the provision of a sliding cam device comprising a separable pair of cam members each arranged to slide on one of the stringers. A further feature of my invention is an end stop at the starting end of the slide fastener comprising a separable pair of stop members. In each case the separable pair of members is provided with means for joining the members of the pair together when the slide fastener is to be closed.

Further objects of my invention are to simplify the closing operation and the opening operation of the completely separable fastener, and to this end the joining means for the slider or cam device and for the end stop are so arranged that all may be engaged and disengaged simultaneously. The joining means preferably include inter-locking portions and a snap catch for keeping the same in interlocking relation. For separating the fastener into its two parts means are provided for releasing the snap catch. In order to reduce the number of operating parts needed, the cam device or slider is so arranged that the customary finger piece or pull tab and bail used for drawing the sliding cam device or slider longitudinally along the stringers may also be used for opening the snap catch, preferably by a transverse movement of the bail and/or finger piece.

The conventional locking means on the stringers must be started in proper registry at the beginning of the closing operation, for otherwise the stringers will be locked together in displaced relation. This difficulty does not exist in present conventional slide fasteners because at least one end thereof, the starting end, is always closed, and therefore is always in proper registry. However, when the two stringers are completely separated and subsequently brought together, it is necessary to insure that they will always be brought together in proper registry. Also, when the cam device is separated, the halves thereof are relatively open at their mating or adjoining sides, and the stop members and stringers tend to escape therefrom. To obviate these difficulties is a further object of my invention, and for this purpose each of the stop members is provided with means for engaging and holding the corresponding cam member, fixing the location thereof with respect to the stop members, when the fastener is opened. The cam members and stop members may therefore be joined together not only simultaneously, as was mentioned previously, but also with the desired accurate registry.

To the accomplishment of the foregoing and such other objects as will hereinafter appear, my invention consists in the fastener elements and their relation one to the other as hereinafter are more particularly described in the specification and sought to be defined in the claims. The specification is accompanied by a drawing in which:

Fig. 1 is a plan view of one of the cam members;

Fig. 2 is a front elevation of this member with the bail removed;

Fig. 3 is a side elevation of the same member with the bail and a portion of the finger piece in place;

Fig. 4 is a front elevation of the mating cam member;

Fig. 5 is a plan view of the latter cam member;

Fig. 6 is a horizontal section of the assembled sliding cam device taken on the line 6—6 in Fig. 7;

Fig. 7 is a front elevation of a completely separable slide fastener embodying my invention, the finger piece being in section;

Fig. 8 is a horizontal section taken in the plane of the line 8—8 in Fig. 7;

Fig. 9 is a fragmentary vertical section taken in the plane of the line 9—9 in Fig. 3;

Fig. 10 is a front elevation of the separable end stop in joined relation;

Fig. 11 is a section taken in the plane of the line 11—11 in Fig. 10;

Fig. 12 is a plan view of the stop member shown in Fig. 11;

Fig. 13 is a plan view of the mating stop member; and

Fig. 14 is a vertical section taken in the plane of the line 14—14 in Fig. 13.

Referring to the drawing, and more particularly to Fig. 7 thereof, it will be observed that the complete slide fastener comprises a pair of flexible stringers A and B, a sliding cam device or slider C for locking and unlocking the stringers, end stops D for the terminating end of the stringers, and an end stop E for the starting end of the stringers. To this extent the slide fastener of my invention resembles those in common use, and, in fact, the interlocking means on the stringers A and B, and the end stops D, may be of any conventional or known type. Also, the cam surfaces in the sliding cam C will be of conventional shape, determined by the particular species of interlocking means employed on the stringers.

The slide fastener of my invention, however, differs markedly from the conventional fastener in that it is completely separable. To this end not only are the end stops D separate, and the stringers A and B separable, but also the sliding cam device C is made in two parts, consisting of a separable pair of cams each riding on one of the stringers, and the end stop E at the starting end of the fastener also is made of a separable pair of end stops, each clamped to one of the stringers. The slide fastener being or capable of being in other respects conventional, these novel separable cam and stop units will each next be described, with reference to Figs. 1 through 14 of the drawing.

The sliding cam device C consists of a first cam member 2, best shown in Fig. 2 of the drawing, a second cam member 4, best shown in Figs. 4 and 5 of the drawing, a bail 6, shown in Figs. 1, 3, 6, 7, and 8 of the drawing, and a finger piece 8, a fragment of which is shown in Figs. 3, 6, and 7 of the drawing.

Each of the cam members 2 and 4 consists of a bent cam surface 10 having a channel-shaped section in order to provide an outwardly disposed slot 12 through which the fabric or tape of the stringers A and B runs during the operation of the fastener.

The cam members are provided with interlocking portions and with a snap catch for holding said portions in interlocked relation. More specifically, at the lower end of the cam member 2 there are provided a pair of transversely projecting ears 14 and 16. At the lower end of the cam member 4 there are provided a pair of hooks 18 and 20, the hook 18 being arranged to mate with the ear 14, and the hook 20 being arranged to mate with the ear 16. The upper end of the cam member 2 carries a yoke arm 22, provided with a recess 24. At the upper end of the cam member 4 there is a yoke arm 26, which is narrowed and formed into a catch 28. The cam members 2 and 4 may be joined together by interlocking the hooks 18 and 20 with the ears 14 and 16, and thereafter snapping the upper ends or yoke arms of the cam members together, the catch 28 snapping into the recess 24, and the arms 22 and 26 forming a yoke between the cam members. The manner in which the yoke arms are brought together is indicated most clearly in Figs. 7 and 9, the arm 22 bearing down on the arm 26 and thereby preventing disengagement of the interlocked portions at the lower end of the cam.

The arm 22 carries a forward extension 30, the extremity of which is bent downwardly to form a pin 32. The ear 14 carries a downwardly extending hook 34. The pin 32 and the hook 34 serve to pivotally carry the bail 6, this consisting of a straight track or guide portion, and upper and lower ends which are bent over to form bearings for the pin 32 and the hook 34. The upper bearing is a simple aperture, while the lower bearing is an aperture provided with a biased slot 36, best shown in Fig 6. The bail may be assembled by placing the upper bearing thereof on the pin 32, and thereafter slipping the lower bearing over the hook 34.

The bail carries a handle, pull tab, or finger piece 8, which may be of practically conventional form, except that it is desirable that the slot 38 therein be made only slightly wider than the thickness of the track of the bail, so as to facilitate the application of a side or twisting movement to the bail in order to turn the same about the pin 32 and the hook 34.

The upper yoke arm 22 carries a protuberance 40, formed by indenting the top of the arm. The upper bearing of the bail is extended to form a tang 42, located next to the inner side of the protuberance 40, as is best shown in Figs. 1, 3, and 9. When it is desired to open the sliding cam device it is merely necessary to apply a side pull or a twisting movement to the bail 6, either by direct pressure, or with the aid of the finger piece 8, in order to cause the tang 42 to press against the protuberance 40 and thereby raise the arm 22, so as to release the catch 28 from the recess 24.

This assemblage also serves the function of preventing the bail 6 from accidentally becoming detached from the cam member 2, that is to say, the tang 42 is kept at all times to one side of the protuberance 40, which position prevents the slot 36 in the lower bearing of the bail 6 from ever becoming so aligned as to be capable of sliding from the hook 34, except, of course, if intentionally twisted past the protuberance 40 for the express purpose of disassembling the unit.

The separable end stop E will next be described, in connection with Figs. 7 through 14. This consists of a pair of end stop members 50 and 52, which mate together in a manner best shown in Figs. 8 and 10. Each of these stop members comprises at its outer edges relatively contractable jaws 54, (see Figs. 12 and 13), which are clamped over the corded edges of the tapes or stringers of the slide fastener. One of these members is apertured as at 56, and the other is provided with a hook 58, stamped out of one side of the stop member. The aperture 56 and hook 58 constitute interlocking means for joining the stop members together.

Each of the stop members is provided with a horizontally projecting vertically disposed anchor lug 60. These lugs mate with slots 62 cut into the forward faces of the cam members. The lugs and slots are so positioned that when the sliding cam device C is pulled down to the starting end of the slide fastener the cam members not only are stopped by the stop E in the usual manner, but also engage and are anchored by the frictional engagement of the lugs 60 and slots 62. This engagement insures that the relative positions of the cam members and stop members will be maintained even after the cam and stop members have been separated. It further insures that the stop members and the stringers will not move out through the partially opened faces of the cam members which result when the contiguous faces of the cam members are separated.

The hook fastener means 56 and 58 is positioned and shaped in a manner identical with that of the hook fastening means 14, 16, 18, and 20 on the cam members, so that the separable stop members and the separable cam members may be hooked together, with a single movement, the user not even being conscious in fact, that a plurality of devices are being simultaneously joined. Similarly, the entire cam and stop assemblage is separated by a single movement, when the slide fastener is opened, in an equally simple manner.

The operation of the invention, while probably already apparent from the foregoing description, may be summarized as follows. Assume that the garment or other article employing the slide fastener is closed. To open the same the finger piece 8 is grasped and pulled toward the starting end of the slide fastener, in the manner usual with present fasteners. When the sliding cam device has been pulled to the starting end of the stringers the finger piece is twisted slightly to one side, or the bail 6 may be pressed directly to that side, whereupon the snap catch of the yoke of the sliding cam device is opened, and the cam members and stop members readily come apart as though a single separable device. When it is desired to close the slide fastener it is merely necessary to hook the lower ends of the cam and stop assemblage and snap the upper ends or yoke arms together. The stop members will incidentally have been properly mated to bring the stringers in correct registry. The finger piece is then grasped and the sliding cam device pulled toward the terminating end of the slide fastener in the present customary manner. When the first few locking units on the stringers have been locked together, longitudinal relative movement of the stop members 50 and 52 is effectually prevented, thereby stopping them from becoming unhooked or separated from one another.

It will be apparent that while I have shown and described my invention in the preferred form, many changes and modifications may be made in the structure disclosed without departing from the spirit of the invention, defined in the following claims.

In these claims, as well as in the foregoing specification, by the term "sliding cam device" I mean to include any coupling means or cam device which moves relative to the fastener or locking means which it serves to couple or lock together, regardless of whether or not the device actually slides along the fastener, or runs on rollers, or other such variation. Also, in referring to a "pair" of cam members or stop members, and in referring to them as "halves" of the complete device, I do not mean to imply that these members need be exactly alike, for obviously, even in the specific modifications here set forth they differ. I also wish it to be understood that in special cases more than two collaterally related stringers may be employed, and also, that a plurality of complete fasteners may be located and used in adjacent end to end relation, for in each case the fastener, in the relatively simple form in which I have here disclosed it, is merely a basic unit a number of which may be employed together in various combinations. I may also mention that my fastener may be used in the manner now customary when it is not necessary or not desired to take advantage of its special features permitting complete separation.

I claim:

1. A sliding cam device for the stringers of a slide fastener comprising a separable pair of cam members arranged to slide on the stringers, means to join said members together, and an actuating means cooperating with said joining means and so arranged that movement thereof longitudinally of the stringers moves the sliding cam, and movement thereof transversely of the stringers releases the joining means in order to separate the cam members.

2. A coupling device for the stringers of a fastener comprising separable cam members arranged to move along the stringers, means to join said members together, a sidewardly movable finger piece connected to the coupling device, and means actuated by a sideward movement of the finger piece for releasing the joining means in order to facilitate separation of the cam members.

3. A cam device for the stringers of a fastener comprising a separable pair of cam members each arranged to move on one of the stringers, means to join said members together, a transversely movable bail on the cam device, and means actuated by a transverse movement of the bail for releasing the joining means in order to separate the cam members.

4. A cam device for the stringers of a fastener comprising a separable pair of cam members arranged to move on the stringers, and means to join said members together comprising mated interlocking means at the lower end of said members and a snap catch at the upper end of said members.

5. A sliding cam device for the stringers of a slide fastener comprising a separable pair of cam members each arranged to slide on one of the stringers, means to join said members together comprising non-resilient interlocking portions and a snap catch for keeping said portions in interlocked relationship, and means for releasing the catch in order to unlock and separate the cam members.

6. A sliding cam device for the stringers of a slide fastener comprising a separable pair of cam members each arranged to slide on one of the stringers, means to join said members together comprising mated interlocking means at one end of said members and a snap catch at the other end of said members, and actuating means for moving the sliding cam and for opening the snap catch in order to separate the cam members.

7. A sliding cam device for the stringers of a slide fastener comprising a separable pair of cam members each arranged to slide on one of the stringers, means to join said members together comprising a pair of hook and ear fasteners at the lower end of said members and a snap catch at the upper end of said members, a finger piece, a transversely movable bail connecting said finger piece to one of the cam members, and means actuated by a transverse movement of the bail for opening the snap catch in order to separate the cam members.

8. In a slide fastener, a sliding cam device comprising a separable pair of cam members adapted to slide on the stringers of the fastener, means for interlocking the cam members, an end stop comprising a separable pair of stop members adapted to be fastened to the stringers at one end thereof, each of said stop members being provided with means for interengaging and frictionally retaining the corresponding cam member in a desired position relative to the stop member when the slide fastener is opened.

9. In a slide fastener, a sliding cam device comprising a separable pair of cam members adapted to slide on the stringers of the fastener, an end stop comprising a separable pair of stop members adapted to be fastened to the stringers at one end thereof, each of said stop members being provided with means for interengaging and frictionally retaining the corresponding cam member in a desired position relative to the stop member when the slide fastener is opened, said cam members and stop members being provided with means for joining the members of the pairs together.

10. In a slide fastener, a sliding cam device comprising a separable pair of cam members adapted to slide on the stringers of the fastener, an end stop comprising a separable pair of stop members adapted to be fastened to the stringers at one end thereof, each of said stop members being provided with coupling means for engaging and holding the corresponding cam member to the stop member when the slide fastener is opened, said cam members and stop members being provided with interlocking means for joining the members of the pairs together, and said interlocking means being arranged for simultaneous engagement or disengagement of the stop members and cam members held thereto.

11. In a slide fastener, in combination, a sliding cam device and an end stop, said sliding cam device comprising a separable pair of cam members, means for joining the pair of members together, and means for releasing the joining means, said end stop comprising a separable pair of stop members provided with means for joining them together, and coupling means for holding the corresponding cam members on the stop members when the joining means are released.

12. In a slide fastener, a sliding cam device and an end stop, said sliding cam device comprising a separable pair of cam members, means for joining the pair of members together, and means for releasing the joining means, said end stop comprising a separable pair of stop members, coupling means for fixing the location of the cam members with respect to the stop members when the slide fastener is opened, and means for joining the stop members together when the slide fastener is closed, the joining means of the cam members and of the stop members being suitably arranged and relatively located for simultaneous operation when the cam members are properly located with respect to the stop members as aforesaid.

13. In a slide fastener, a sliding cam device and an end stop, said sliding cam device comprising a separable pair of cam members, means for joining the pairs of members together, a transversely movable finger piece and a bail connecting the same to the cam members, and means actuated by a transverse movement of the finger piece for opening the joining means, said end stop comprising a separable pair of stop members provided with means for joining them together, the joining means of the cam members and of the stop members being arranged for simultaneous operation.

14. In a slide fastener, a sliding cam device and an end stop, said sliding cam device comprising a separable pair of cam members, means for joining the pair of members together, a transversely movable finger piece and a bail connecting the same to the cam members, and means actuated by a transverse movement of the finger piece for opening the joining means, said end stop comprising a separable pair of stop members provided with means for fixing the location of the cam members with respect to the stop members when the slide fastener is opened, and means for joining the stop members together when the slide fastener is closed, the joining means of the cam members and of the stop members being arranged for simultaneous operation.

15. In a slide fastener, a sliding cam device and an end stop, said sliding cam device comprising a separable pair of cam members, interlocking portions at one end thereof and a snap catch at the other end thereof for joining the pair of members together, a transversely movable finger piece and a bail connecting the same to the cam members, and means actuated by a side movement of the bail for opening the snap catch, said end stop comprising a separable pair of stop members provided with means for fixing the location of the cam members with respect to the stop members when the slide fastener is opened, and interlocking portions for joining the stop members together when the slide fastener is closed, the interlocking portions of the cam members and of the stop members being arranged for simultaneous engagement or disengagement.

16. In a slide fastener of the kind having stringers carrying series of interengageable fastener elements, in combination, a slider and an end stop, the slider comprising a pair of cam members and means for detachably joining the cam members, the end stop comprising a pair of separable stop members attached, respectively, to the opposite stringers, and connecting means operative temporarily to unite each of the cam members to one of the stop members.

17. In a slide fastener of the kind having stringers carrying series of interengageable fastener elements, in combination, a slider, and an end stop adjacent to that end of the fastener from which the slider moves in closing the fastener, the slider comprising a pair of cam members and means for detachably joining the cam members, the end stop comprising a pair of stop members attached, respectively, to the opposite stringers, and connecting means operative temporarily to unite each of the cam members to one of the stop members, said connecting means comprising interfitting frictionally engaging elements.

18. In a slide fastener of the kind having stringers carrying series of interengageable fastener elements, in combination, a slider and an end stop, the slider comprising a pair of cam members and means for adjustably joining the cam members, the end stop comprising a pair of separable stop members attached, respectively, to the opposite stringers, disengageable holding means normally uniting said stop members and connecting means operative temporarily to unite each of the cam members to one of the stop members, said connecting means comprising a socket in the cam member, and a lug on the stop member adapted to fit within the socket.

19. In a slide fastener of the class described, in combination, a slider, a pull tab for actuating the slider, a tab supporting bail constituting a guide along which the pull tab may move longitudinally of the slider, and pivot means for the bail defining an axis extending longitudinally of the slider about which the bail may swing.

20. In a slide fastener of the class described, in combination, a slider, a pull tab for actuating the slider, and a pull tab support carried by the slider, pivot means for said support defining an axis extending longitudinally of the slider and about which the support, together with the pull tab, may swing, the pull tab and support having engaging parts so constructed and arranged as to permit the pull tab to swing about an axis transverse of the slider.

21. In a slide fastener of the class described, in combination, a slider, a pull tab for actuating the slider, and a pull tab support carried by the slider, said tab support comprising a track extending longitudinally of the slider, and the pull tab having parts engaging opposite edges of the track so constructed and arranged as to allow bodily movement of the pull tab longitudinally of the track, and means defining a pivotal axis extending longitudinally of the slider about which the pull tab support may swing.

22. In a slide fastener of the kind having stringers carrying series of interengageable fastener elements and a slider comprising two separable parts, in combination, a locking element carried by one part of the slider and a part on the other part of the slider with which the locking element engages, a pull tab movable transversely of the slider, means on the slider for supporting the pull tab, and a member mounted on one of the slider parts and actuable by transverse movement of the pull tab to disengage said locking element from the part with which the latter normally engages.

Signed at Hoboken in the county of Hudson and State of New Jersey this 7th day of June A. D. 1929.

ISIDOR JACOBS.